United States Patent
Zhai et al.

(10) Patent No.: US 8,879,457 B2
(45) Date of Patent: Nov. 4, 2014

(54) METHOD AND SYSTEM FOR ALLOCATING RESOURCES TO MULTIMEDIA BROADCAST MULTICAST CONTROL CHANNEL

(75) Inventors: Hengxing Zhai, Guangdong Province (CN); Jianxun Ai, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 431 days.

(21) Appl. No.: 13/258,035

(22) PCT Filed: Apr. 27, 2010

(86) PCT No.: PCT/CN2010/072260
§ 371 (c)(1),
(2), (4) Date: Jan. 13, 2012

(87) PCT Pub. No.: WO2011/012001
PCT Pub. Date: Feb. 3, 2011

(65) Prior Publication Data
US 2012/0134311 A1 May 31, 2012

(30) Foreign Application Priority Data
Jul. 30, 2009 (CN) .......................... 2009 1 0161824

(51) Int. Cl.
*H04W 4/06* (2009.01)
*H04W 72/00* (2009.01)
*H04L 12/18* (2006.01)

(52) U.S. Cl.
CPC ......... *H04W 72/005* (2013.01); *H04L 12/1818* (2013.01); *H04W 4/06* (2013.01)
USPC ............................................ 370/312; 370/252

(58) Field of Classification Search
USPC ........ 370/312, 444, 468; 455/450, 507, 404.1
See application file for complete search history.

(56) References Cited

U.S. PATENT DOCUMENTS

| | | | |
|---|---|---|---|
| 2004/0223513 A1* | 11/2004 | Meago | 370/468 |
| 2005/0180378 A1 | 8/2005 | Lee et al. | |
| 2009/0046617 A1* | 2/2009 | Tenny et al. | 370/312 |
| 2010/0178895 A1* | 7/2010 | Maeda et al. | 455/404.1 |
| 2010/0323707 A1* | 12/2010 | Huschke et al. | 455/450 |
| 2011/0021224 A1* | 1/2011 | Koskinen et al. | 455/507 |
| 2013/0308517 A1* | 11/2013 | Lee et al. | 370/312 |

OTHER PUBLICATIONS

International Search Report for PCT/CN2010/072260 dated Jun. 28, 2010.

* cited by examiner

*Primary Examiner* — Vinncelas Louis
(74) *Attorney, Agent, or Firm* — Ling Wu; Stephen Yang; Ling and Yang Intellectual Property

(57) ABSTRACT

The invention discloses a method and a system for allocating resource to a multimedia broadcast multicast control channel, wherein the method includes: an upper level network element allocating at least one multicast subframe to the MCCH; the upper level network element transmitting MCCH resource allocation information to a lower level network element, indicating the lower level network element to transmit channel information of the MCCH in the at least one multicast subframe. The invention solves a problem of lack of consistency of allocation of physical resource to the MCCH, supports the UE to perform a combination for the received multi-cell MCH signals, enhances signal gain, and improves user experience.

9 Claims, 4 Drawing Sheets

METHOD AND SYSTEM FOR ALLOCATING RESOURCES TO MULTIMEDIA BROADCAST MULTICAST CONTROL CHANNEL

TECHNICAL FIELD

The present invention relates to the communications field and, in particular, to a method and a system for allocating resource to a multimedia broadcast multicast control channel.

BACKGROUND OF THE RELATION ART

With the rapid development of Internet and popularity of big screen multi-function mobile phones, a plenty of mobile data multimedia services have come forth and various high bandwidth multimedia services arise, such as video conference, television broadcast, video on demand, advertisement, online education, interactive game, and so on, which satisfies the growing service demand of mobile users on the one hand, and brings a new business growth point for mobile operators on the other hand. These mobile data multimedia services require that multiple users are able to simultaneously receive the same data, compared with general data services, they have characteristics such as large data amount, long duration and delay sensibility.

For effective utilization of mobile network resource, the 3$^{rd}$ Generation Partnership Project (3GPP) proposes the Multimedia Broadcast Multicast Service (MBMS Service) which is a kind of technique in which data is sent from one data source to multiple targets so that the network (including core network and access network) resource is shared and the utilization ratio of the network resource, especially the air interface resource, is improved. The MBMS defined in the 3GPP not only can implement low-speed multicast and broadcast of plain text messages, but also can implement high-speed broadcast and multicast of multimedia services, to provide a wide variety of video, audio and multimedia services, which undoubtedly complies with the future development trend of mobile data, and provides a better business prospect for 3G development.

In LTE, the MBMS services can adopt a multicast mode and each corresponds to one MCCH (Multicast Control Channel) and one MTCH (Multicast Traffic Channel), and the MTCH and MCCH both are logic channels. A plurality of cells send the same MBMS data on the same time-frequency resource, that is, MBMS service information or control information adopts a fashion of content synchronization, which is called MBSFN (Multicast/Broadcast over Single Frequency Network) transmission mode. A plurality of cells adopting the same physical resource (i.e., synchronization) and transmitting the same MBMS data in a MBSFN transmission mode form a MBSFN area. The MBMS services transmitting information using a multicast mode are called MBSFN services.

The MBSFN transmission mode can synchronously transmit the same content after a plurality of cells adopt the same modulated coding format, and has the following features:

1. synchronously transmitting within the MBSFN area;
2. supporting multi-cell MBMS transmission combination, that is, the user equipment performs combination of the received service information and control information of the MBMS in different cells;
3. MTCH (Multicast Traffic Channel) and MCCH (Multicast Control Channel) are mapped to a MCH transmission channel in a p-T-m (Point-To-Multipoint) mode;
4. the parameters, such as MBSFN synchronous area, MBSNF area, MBSFN transmission, advertisement and reserved cell, generally have long variation periods and are all be maintained a semi-static configuration by operation.

In this case, the UE (User Equipment) covered by a plurality of cells within the MBSFN area can receive MBMS data with the same content transmitted by the plurality of cells, and perform SFN combination for the MBMS data, so that gain of signals of the MBMS services received by the UE can be improved. In an actual LTE networking, there are a plurality of MBSFN services in one MBSFN area, and all the MBSFN services in the same MBSFN area are called a MBSFN service group, that is, a MBSFN service group corresponds to a MBSFN area. Every cell within a MBSFN area is provided with a completely same MBSFN service group. The MTCH and MCCH having a plurality of MBSFN services in the same MBSFN area can be mapped to one MCH (Multicast Channel) for multiplexing the MCH, wherein the MCH is a transmission channel.

The physical resource occupied by the MCH, i.e., the number and locations of the occupied multicast subframes, is described by MSAP (MCH Subframe Allocation Pattern) information. Generally, the MSAP information is available only within a period of time, and then the physical resource occupied by the MCH will be re-configured, wherein the available time of the MSAP information is called MSAP occasion, and generally one dynamic scheduling period corresponds to one MSAP occasion generally with a fixed length of 320 ms. A plurality of MCH and dynamic scheduling information can be transmitted in a dynamic scheduling period, and each MCH carries a plurality of MTCH and MCCH borne in each MCH. As for one MCH, dynamic scheduling information can be borne in a MAC control element or in a single logical channel MSCH (Multicast scheduling channel). The MSAP information allocates at least one subframe for the MCH, wherein the subframes transmitted in a multicast mode are called multicast subframes, and the frame containing multicast subframes is called a MBSFN frame.

Each MCH corresponds to a plurality of continuous multicast subframes. In order to improve the transmission rate of the MTCH in the MCH, a method of dynamic scheduling is used for a plurality of MTCHs borne in one MCH. By means of dynamic scheduling, two or more MTCHs can be multiplexed on the multicast subframes of the same MCH and part of or total resource of the multicast subframes can be occupied, wherein each MCH corresponds to dynamic scheduling information which is used to describe the allocation of the physical resource of each MTCH in one MCH (i.e., the occupied multicast subframes).

In the existing LTE technology, a plurality of logical channels comprising a MTCH (MBMS Traffic Channel), a MCCH (Multicast Control Channel) and a MSCH (MBMS Scheduling Channel) multiplex the MCH channel by the following way: data transmitted by different logical channels form a MAC SDU (Service Data Unit), a plurality of MAC SDUs correspond to one MAC PDU (Media Access Control Layer Protocol Data Unit), each MAC PDU corresponds to one transmission data block, while a multicast subframe corresponds to a TTI (Transmission Time Interval) within which one or more transmission data blocks can be transmitted. That is to say, data of a plurality of different kinds of logical channels can be transmitted within one multicast subframe.

To distinguish the MAC SDUs from different logical channels, identifier information is carried in MAC PDU, such as identifiers of logical channels and the location information of the data block of the logical channel in the MAC PDU, for the receiving end to distinguish data blocks of different logical channels.

In a dynamic scheduling period, the data transmitted by a MTCH continuously occupies the multicast subframe resource of the MCH channel until the service data of the service that need to be transmitted within the dynamic scheduling period are all completely transmitted. Data of different services can be transmitted within the same multicast subframe, that is, data from different services in the same MAC PDU can be in tandem connection for transmission. The above service transmission order can be notified to the receiving end through the MCCH or other signaling.

In each MSAP occasion configured in one MCH, the MCCH is borne and the control information of the MBMS service is carried, the control information indicates the control information of all the MBMS services within a dynamic scheduling period. The UE can obtain the service identifier and session identifier of the MSMB service corresponding to the MCCH, service parameters (radio bearer information, physical channel configuration information, scheduling information and so on), and actions that needs to be implemented by the UE and so on by means of reading the MCCH.

There are the following problems when the data of the MBMS services are transmitted in the MBSFN mode:

The amount of the MBMS services that need to be transmitted within different dynamic scheduling periods is also different, and accordingly, the size of the information carried by the MCCH used to describe the transmission order of each MBMS service is also different, and the physical resource occupied by the MCCH channel will be adjusted according to the size of the information carried by the MCCH.

When the UE located in a MBSFN area receives the MCH, the signals of the same MCH from different cells can be softly combined, that is, the same signals are combined. However, there is no clear definition on the location of multicast subframe occupied by the MCCH in the MCH. When the MBMS service data are transmitted through the MCH, different lower level network elements in the same MBSFN area may place the MCCH at different locations of the MCH and the allocation of the physical resource to the MCCH lacks consistency, so that the signals received by the UE from different cells are not consistent and cannot be combined, thereby reducing the user experience.

SUMMARY OF THE INVENTION

The present invention provides a method and a system for allocating resource to a MCCH, thereby solving the problem of lack of consistency for allocation of a physical resource to the MCCH.

To solve the above technical problem, the present invention provides a method for allocating resource to a multimedia broadcast multicast channel MCCH, comprising:

an upper level network element allocating at least one multicast subframe for the MCCH;

the upper level network element transmitting MCCH resource allocation information to a lower level network element, indicating the lower level network element to transmit channel information of the MCCH in the at least one multicast subframe.

Preferably, in the step of the upper level network element allocating at least one multicast subframe to the MCCH, the upper level network element allocates one multicast subframe or more than one continuous multicast subframe to the MCCH according to the information amount of the channel information of the MCCH and the number of available multicast subframes.

Preferably, in the step of the upper level network element allocating one multicast subframe or more than one continuous multicast subframe for the MCCH, when the upper level network element allocates one multicast subframe to the MCCH, the multicast subframe is an exclusive subframe or a shared subframe;

when the upper level network element allocates more than one continuous multicast subframes to the MCCH, the more than one continuous multicast subframe is all exclusive subframes; or the last multicast subframe in the more than one continuous multicast subframe is a shared subframe and other multicast subframes are exclusive subframes; or the first multicast subframe in the more than one continuous multicast subframe is a shared subframe and other multicast subframes are exclusive subframes.

Preferably, when the method is applied to a universal terrestrial radio access network (UTRAN) system, the upper level network element is an upper level radio network controller (RNC) and the lower level network element is a lower level RNC;

in the step of the upper level network element transmitting the MCCH resource allocation information to the lower level network element, the upper level RNC transmits the MCCH resource allocation information to the lower level RNC via an Iur interface.

Preferably, when the method is applied to an enhanced high speed packet access system (HSPA+), the upper level network element is a general packet radio service (GPRS) service support node (SGSN) or a GPRS gateway support node (GGSN) or a broadcast multicast service center (BMSC), and the lower level network element is a RNC or an enhanced node B.

Preferably, when the method is applied to a long term evolved system (LTE), the upper level network element is a BMSC or a MBMS service gateway (MGW) or a multi-cell/multicast coordination entity (MCE), and the lower level network element is an evolved node B.

Preferably, after the step of the upper level network element transmitting the MCCH resource allocation information to the lower level network element, further comprising:

the lower level network element transmits channel information of the MCCH to the user equipment (UE) via a radio interface in the at least one multicast subframe, according to the MCCH resource allocation information.

The present invention provides a system for allocating resource to a multimedia broadcast multicast control channel (MCCH), comprising an upper level network element and a lower level network element;

wherein the upper level network element is configured to allocate at least one multicast subframe to the MCCH and transmit the MCCH resource allocation information to the lower level network element, indicating the lower level network element to transmit channel information of the MCCH in the at least one multicast subframe.

Preferably, the lower level network element is configured to transmit channel information of the MCCH to the UE via a radio interface in the at least one multicast subframe, according to the MCCH resource allocation information transmitted by the upper level network element.

The present invention provides an upper level network element supporting allocation of resource to a multimedia broadcast multicast control channel (MCCH), comprising an allocation module and a transmission module, wherein the allocation module is configured to allocate at least one multicast subframe to the MCCH;

the transmission module is configured to transmit MCCH resource allocation information to the lower level network element, indicating the lower level network element to transmit channel information of the MCCH in the at least one multicast subframe allocated by the allocation module.

Preferably, the allocation module is further configured to allocate one multicast subframe or more than one continuous multicast subframe to the MCCH according to the information amount of channel information of the MCCH and the number of available multicast subframes.

Preferably, the allocation module is further configured to: when one multicast subframe is allocated to MCCH, configure the multicast subframe to be an exclusive subframe or a shared subframe; and when more than one continuous multicast subframe is allocated to the MCCH, configure the more than one continuous multicast subframe all to be exclusive subframes; or configure the last multicast subframe in the more than one continuous multicast subframe to be a shared subframe and other multicast subframes to be exclusive subframes; or configure the first multicast subframe in the more than one continuous multicast subframe to be a shared subframe and other multicast subframes to be exclusive subframes.

Preferably, in a universal terrestrial radio access network (UTRAN) system, the upper level network element is an upper level radio network controller (RNC);

in an enhanced high speed packet access system (HSPA+), the upper level network element is a general packet radio service (GPRS) service support node (SGSN) or a GPRS gateway support node (GGSN) or a broadcast multicast service center (BMSC);

in a long term evolved system (LTE), the upper level network element is a BMSC or a MBMS service gateway (MGW) or a multi-cell/multicast coordination entity (MCE).

The embodiments of the present invention provide a method and a system for allocating resource to a MCCH, wherein the upper level network element uniformly allocates physical resource, i.e. the occupied at least one multicast subframe, to the MCCH, and the MCCH resource allocation information is issued to the lower level network element to indicate that the lower level network element transmits channel information of the MCCH through the MCCH in the at least one multicast subframe, thereby solving the problem of lack of consistency of allocation of physical resource to a MCCH, supporting the UE to perform combination for the received multi-cell MCH signals, enhancing signal gain, and improving user experience.

PREFERRED EMBODIMENTS OF THE PRESENT INVENTION

To solve the problem that allocation of physical resource to MCCH lacks consistency so that the UE cannot perform signal combination, the embodiments of the present invention provide a method for allocating resource to a MCCH.

Figure 1:
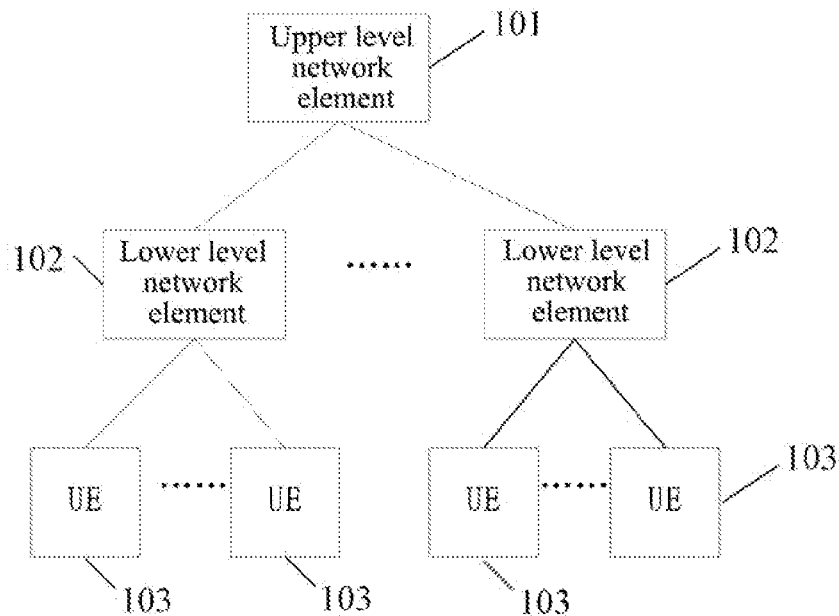
FIG. 1 is a schematic diagram of a network system used in the embodiment of the invention.

Firstly, the application scenes of the embodiments of the invention are introduced. As illustrated in FIG. 1, a network is composed of an upper level network element 101, at least one lower level network element 102 and at least one UE 103, wherein the at least one lower level network element 102 forms a MBSFN area which belongs to the upper level network element 101; and the UE 103 is in the MBSFN area. The upper level network element 101 and the lower level network element 102 perform signaling interaction. It needs to explain that the upper level network element 101 and the lower level network element 102 can be the same element or can also be different elements in physical function, dividing them into the upper level network elements 101 and the lower level network elements 102 is only a logical partition.

The upper level network element 101 is used to complete scheduling of MBMS service packets. In particular, each service packet is time-stamped by the upper level network element. Subsequently, the time-stamped packets are transmitted to each lower level network elements 102 which belongs to the upper level network element 101.

The lower level network element 102 is used to receive the time-stamped packets 1 transmitted by the upper level network element 101, and transmit the service packets processed through the radio network layer user plane protocol at a radio interface according to the timestamp information of each service packet.

In the embodiments of the invention, the upper level network element 101 and the lower level network element 102 can be a combination of the following network elements:

In the MBMS service synchronous networking of a universal terrestrial radio access network (UTRAN) system, the upper level network element is an upper level RNC, and the lower level network element is a lower level RNC, wherein the interface between the upper level network element and the lower level network element is an Iur interface, and the upper level network element and the lower level network element are the same element in physical function in this combination.

In the MBMS service synchronous networking of an enhanced high speed packet access system (HSPA+), the upper level network element is a GGSN (GPRS service support node), a SGSN (GPRS gateway support node) or a BMSC (broadcast multicast service center). The lower level network element is a RNC or an enhanced node B (NB+).

In the MBMS service synchronous networking of a long term evolved system (LTE), the upper level network element is a BMSC, a multimedia gateway (MGW) or a MCE, and the lower level network element is an evolved node B (E-UTRAN NodeB).

The foregoing only enumerates part of the examples of the upper level network element and the lower level network element. A person having ordinary skill in the art apparently knows that the combination of the upper level network element and the lower level network element in the method for allocating resource to a MCCH provided in the embodiments of the invention is not limited to the foregoing, and the invention does not make a definition on that. The embodiments of the invention all make explanation taking LTE system for example.

The following introduces the first embodiment of the invention in combination with the drawings.

Figure 2:
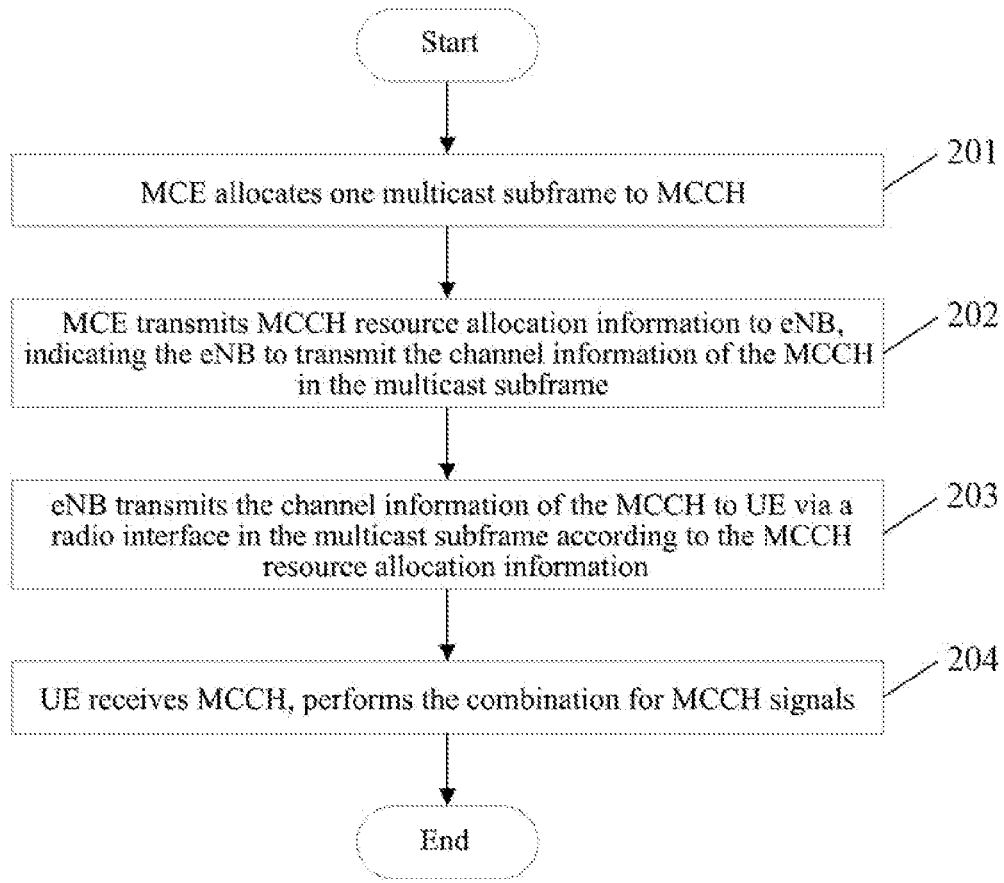
FIG. 2 is a flowchart of a method for allocating resource to a MCCH provided in the first embodiment of the invention.
Figure 3:
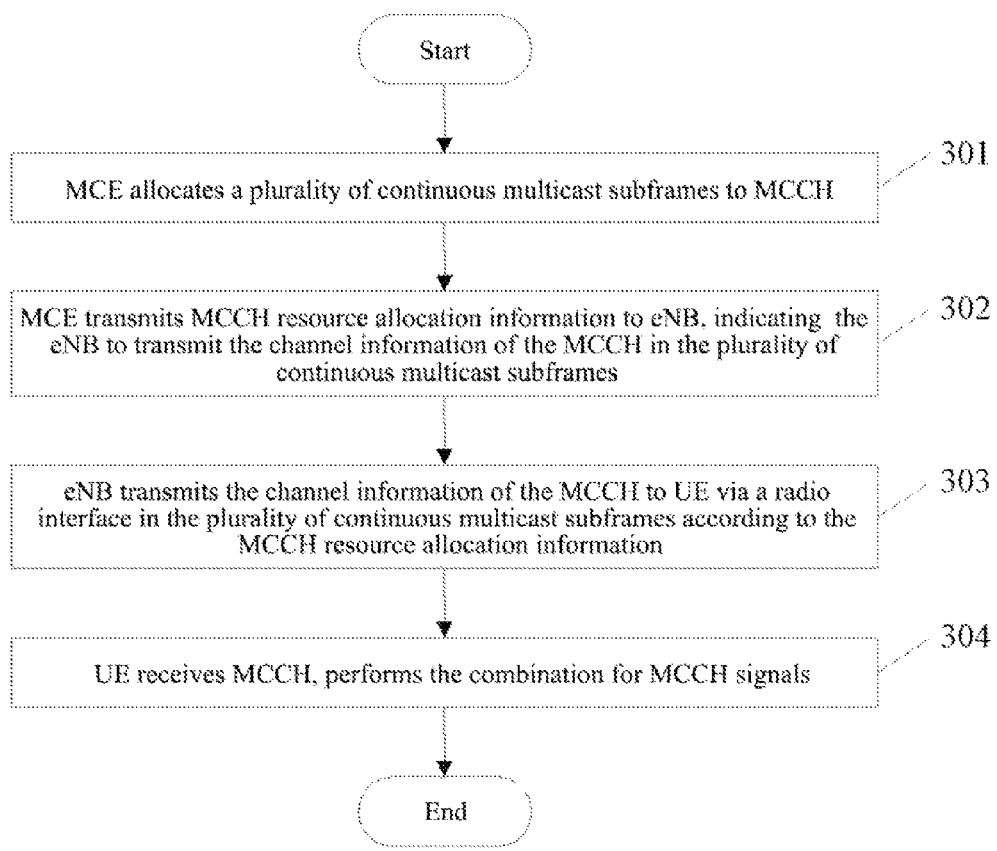
FIG. 3 is a flowchart of a method for allocating resource to a MCCH provided in the second embodiment of the invention.

The first embodiment of the invention provides a method for allocating resource to a MCCH in a LTE system, and the method is used to complete the process of allocating physical resource to the MCCH as illustrated in FIG. 2, comprising:

Step 201, a multi-cell/multicast coordination entity (MCE) allocates a multicast subframe to a MCCH;

the embodiment of the invention makes explanation taking LTE system for example, wherein the MCE is an upper level network element, and the eNB (E-UTRAN NodeB) is a lower level network element.

In that step, the MCE allocates physical resource to the MCCH, that is, allocates at least one multicast subframe, according to the capacity of multicast subframe resource of the MCH and the amount of the resource that the corresponding MCCH needs.

According to the capacity of the MCH multicast subframe resource, a multicast subframe is allocated to the MCCH for transmitting channel information of the MCCH, wherein the multicast subframe is an exclusive subframe and is not for other applications, that is, it is not shared with MSCH, DSI (dynamic scheduled information), MTCH and so on.

Step 202, the MCE transmits the MCCH resource allocation information to the eNB, indicating the eNB to transmit the channel information of the MCCH in the multicast subframe;

In that step, the MCE transmits the MCCH resource allocation information to the eNB, wherein the MCCH resource allocation information comprises information, indicating the eNB that the multicast subframe occupied by the MCCH is an exclusive subframe, and the MCCH resource allocation information is transmitted in the multicast subframe.

The parameters carried in the MCCH resource allocation information comprise: the number of the subframes occupied by the MCCH, for example, in the embodiments of the invention, the MCCH occupies one multicast subframes; the locations of the subframes specifically occupied by the MCCH, such as the subframe numbers of the occupied multicast subframes; the initial location of the subframes occupied by the MCCH, for example, when a plurality of continuous multicast subframes are occupied, the subframe number of the multicast subframe at the initial location is carried in the MCCH resource allocation information; the terminal location of the subframes occupied by the MCCH, for example, when a plurality of multicast subframes are occupied, the subframe number of the multicast subframe at the initial location is carried in the MCCH resource allocation information; and frequency information occupied by the MCCH. The above parameters are only part of the parameters that can be carried in the MCCH resource allocation information. The invention does not make a definition on that.

In that step, the MCE can transmit the MCCH resource allocation information to all the eNBs within the corresponding MBSFN area.

Step 203, the eNB transmits the channel information of the MCCH to the UE via a radio interface in the multicast subframe, according to the MCCH resource allocation information;

in that step, the eNB determines the location of the multicast subframe occupied by the MCCH according to the MCCH resource allocation information transmitted by the MCE in Step 202, and transmits the channel information of the MBMS service through the MCCH to the UE in the respective cells within the MBSFN area through a radio interface in the multicast subframe.

Step 204, the UE receives the MCCH, performs an combination for the MCCH signals.

in that step, the UE located at the MBSFN area receives the MCH signals from a plurality of eNBs, performs the combination for the MCH signals; since the MCH signals from different eNBs are synchronously transmitted, a plurality of MCH signals received by each multicast subframe can be combined.

In the subframes occupied by the MCCH, the UE receives the channel information of the MCCH from a plurality of eNBs, performs the combination for the MCCH signals.

The following introduces the second embodiment of the invention in combination of the drawings.

The second embodiment of the invention provides a method for allocating resource to a MCCH in a LTE system, said method is used to complete the process of allocating physical resource to the MCCH, comprising:

Step 301, the MCE allocates a plurality of continuous multicast subframes to the MCCH;

the embodiment of the invention makes an explanation taking LTE system for example, wherein the MCE is an upper level network element, and eNB is a lower level network element.

In that step, the MCE allocates physical resource to the MCCH, that is, allocates at least one multicast subframe, according to the capacity of the multicast subframe resource of the MCH and the amount of the resource that the corresponding MCCH needs.

According to the capacity of the multicast subframe resource of the MCH, a plurality of continuous multicast subframes are allocated to the MCCH for transmitting channel information of the MCCH; and the plurality of continuous multicast subframes are all exclusive subframes and are not for other applications, that is, they are not shared with MSCH, DSI, MTCH and so on.

Step 302, the MCE transmits the MCCH resource allocation information to the eNB, indicating the eNB to transmit the channel information of the MCCH in the plurality of continuous multicast subframes;

in that step, the MCE transmits the MCCH resource allocation information to the eNB, wherein the MCCH resource allocation information contains the information indicating the eNB that the multicast subframes occupied by the MCCH are exclusive subframes, and the MCCH resource allocation information is transmitted in the multicast subframes.

The parameters carried in the MCCH resource allocation information comprise: the number of the subframes occupied by the MCCH, for example, in the embodiment of the invention, the MCCH occupies a plurality of multicast subframes; the locations of the subframes specifically occupied by the MCCH, such as the subframe numbers of the occupied multicast subframes; the initial location of the subframes occupied by the MCCH, for example, when a plurality of continuous multicast subframes are occupied, the subframe number of the multicast subframe at the initial location is carried in the MCCH resource allocation information; the terminal location of the subframes occupied by the MCCH, for example, when a plurality of multicast subframes are occupied, the subframe number of the multicast subframe at the initial location is carried in the MCCH resource allocation information; and frequency information occupied by the MCCH. The above parameters are only part of the parameters that can be carried in the MCCH resource allocation information. The invention does not make a definition on that.

In the step, the MCE can transmit the MCCH resource allocation information to all the eNBs within the corresponding MBSFN area.

Step 303, the eNB transmits the channel information of the MCCH to the UE via a radio interface in the plurality of continuous multicast subframes according to the MCCH resource allocation information;

in that step, the eNB determines the location of the multicast subframe occupied by the MCCH according to the MCCH resource allocation information transmitted by the MCE in Step 302, and transmits channel information of the MBMS service via the MCCH to the UE of the respective cells within the MBSFN area through a radio interface in the plurality of continuous multicast subframes.

Step 304, the UE receives the MCCH, performs a combination for the MCCH signals.

In the step, the UE located at the MBSFN area receives the MCH signals from a plurality of eNBs, performs the combination for the MCH signals; since the MCH signals from different eNBs are synchronously transmitted, a plurality of MCH signals received by each multicast subframe can be combined.

In the plurality of continuous multicast subframes occupied by the MCCH, the UE receives the channel information of the MCCH from a plurality of eNBs, performs the combination for the MCCH signals.

The following introduces the third embodiment of the invention in combination with the drawings.

Figure 4:
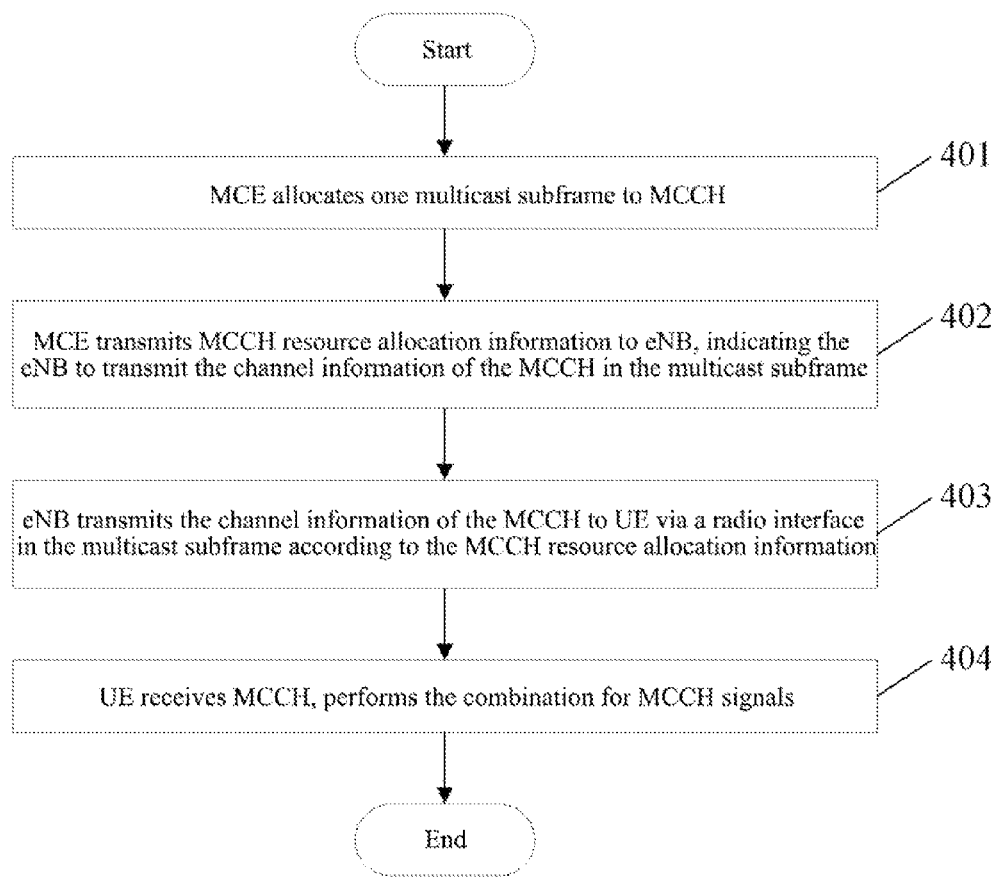
FIG. 4 is a flowchart of a method for allocating resource to a MCCH provided in the third embodiment of the invention.

The third embodiment of the invention provides a method for allocating resource to a MCCH, said method is used to complete the process of allocating physical resource to a MCCH as illustrated in FIG. 4, comprising:

Step 401, the MCE allocates one multicast subframe to the MCCH;

the embodiment of the invention makes an explanation taking LTE system for example, wherein the MCE is an upper level network element, and the eNB (E-UTRAN NodeB) is a lower level network element.

In that step, the MCE allocates physical resource to the MCCH, that is, allocates at least one multicast subframe, according to the capacity of the multicast subframe resource of the MCH and the amount of the resource that the corresponding MCCH needs.

According to the capacity of the MCH multicast subframe resource of the MCH, one multicast subframe is allocated to the MCCH for transmitting channel information of the MCCH, wherein the multicast subframe is a shared subframe and can be for other applications, for example, it is shared with MSCH, DSI, MTCH and so on.

Step 402, the MCE transmits the MCCH resource allocation information to eNB, instructing that eNB transmits the channel information of the MCCH in the multicast subframe;

in the step, the MCE transmits the MCCH resource allocation information to the eNB, wherein the MCCH resource allocation information contains the information indicating the eNB that the multicast subframe occupied by the MCCH is a shared subframe, and the MCCH resource allocation information is transmitted in the multicast subframe.

The parameters carried in the MCCH resource allocation information comprise: the number of the subframes occupied by the MCCH, for example, in the embodiment of the invention, the MCCH occupies one multicast subframes; the locations of the subframes specifically occupied by the MCCH, such as the subframe numbers of the occupied multicast subframes; the initial location of the subframes occupied by the MCCH, for example, when a plurality of continuous multicast subframes are occupied, the subframe number of the multicast subframe at the initial location is carried in the MCCH resource allocation information; the terminal location of the subframes occupied by the MCCH, for example, when a plurality of multicast subframes are occupied, the subframe number of the multicast subframe at the initial location is carried in the MCCH resource allocation information; and frequency information occupied by the MCCH. The above parameters are only part of the parameters that can be carried in the MCCH resource allocation information. The invention does not make a definition on that.

In that step, the MCE can transmit the MCCH resource allocation information to all the eNBs within the corresponding MBSFN area.

Step 403, the eNB transmits the channel information of the MCCH to the UE via a radio interface in the multicast subframe according to the MCCH resource allocation information;

in that step, the eNB determines the location of the multicast subframe occupied by the MCCH according to the MCCH resource allocation information transmitted by the MCE in Step 402, and transmits the channel information of the MBMS service via the MCCH to the UE of the respective cells within the MBSFN area through a radio interface in the multicast subframes.

Step 404, the UE receives the MCCH, performs a combination for the MCCH signals.

In that step, the UE located at the MBSFN area receives the MCH signals from a plurality of eNBs, performs the combination for the MCH signals; since the MCH signals from different eNBs are synchronously transmitted, a plurality of MCH signals received by each multicast subframe can be combined.

In the subframes occupied by the MCCH, the UE receives the channel information of the MCCH from a plurality of eNBs, performs the combination for the MCCH signals.

The following introduces the fourth embodiment of the invention in combination with the drawings.

Figure 5:
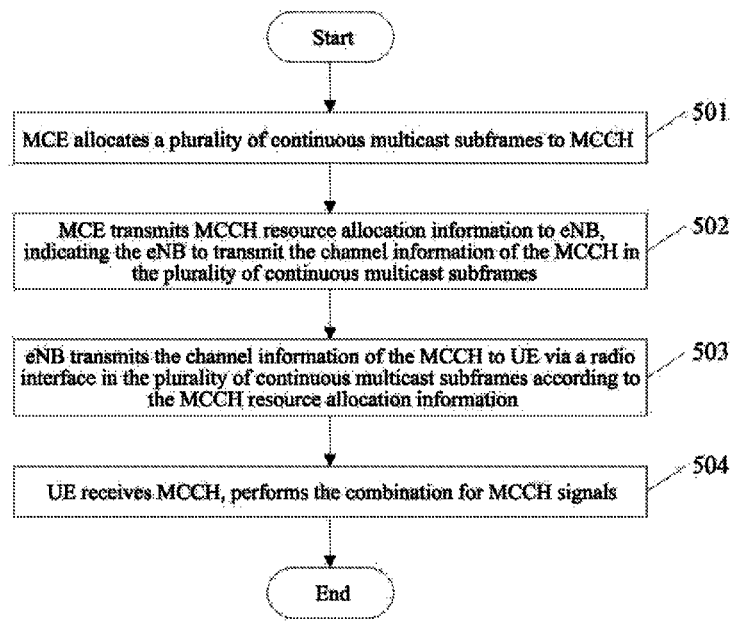
FIG. 5 is a flowchart of a method for allocating resource to a MCCH provided in the fourth embodiment of the invention.

The fourth embodiment of the invention provides a method for allocating resource to a MCCH, said method is used to complete the process of allocating physical resource to the MCCH as illustrated in FIG. 5, comprising:

Step 501, the MCE allocates a plurality of continuous multicast subframes to the MCCH;

the embodiment of the invention makes an explanation taking LTE system for example, wherein the MCE is an upper level network element, and the eNB is a lower level network element.

In that step, the MCE allocates physical resource to the MCCH, that is, allocates at least one multicast subframe, according to the capacity of the multicast subframe resource of the MCH and the amount of the resource that the corresponding MCCH needs.

According to the capacity of the MCH multicast subframe resource, a plurality of continuous multicast subframes are allocated to the MCCH for transmitting channel information of the MCCH, wherein the last multicast subframe is a shared subframe and other multicast subframes are all exclusive subframes; or the first multicast subframe is a shared subframe and other multicast subframes are exclusive subframes.

Step 502, the MCE transmits the MCCH resource allocation information to the eNB, indicating the eNB to transmit the channel information of the MCCH in the plurality of multicast subframes;

in that step, the MCE transmits the MCCH resource allocation information to the eNB, wherein the MCCH resource allocation information contains the information indicating the eNB that the last one in the multicast subframes occupied by the MCCH is a shared subframe and others are exclusive subframes, and the MCCH resource allocation information is transmitted in the plurality of the continuous multicast subframes.

The parameters carried in the MCCH resource allocation information comprise: the number of the subframes occupied by the MCCH, for example, in the embodiment of the invention, the MCCH occupies a plurality of multicast subframes; the locations of the subframes specifically occupied by the MCCH, such as the subframe numbers of the occupied multicast subframes; the initial location of the subframes occupied by the MCCH, for example, when a plurality of continuous multicast subframes are occupied, the subframe number of the multicast subframe at the initial location is carried in the MCCH resource allocation information; the terminal location of the subframes occupied by the MCCH, for example, when a plurality of multicast subframes are occupied, the subframe number of the multicast subframe at the initial location is carried in the MCCH resource allocation information; and frequency information occupied by the MCCH. The above parameters are only part of the parameters that can be carried in the MCCH resource allocation information. The invention does not make a definition on that.

In that step, the MCE can transmit the MCCH resource allocation information to all the eNBs within the corresponding MBSFN area.

Step 503, the eNB transmits the channel information of the MCCH to the UE via a radio interface in the plurality of continuous multicast subframes according to the MCCH resource allocation information;

in that step, the eNB determines the location of the multicast subframe occupied by the MCCH according to the MCCH resource allocation information transmitted by the MCE in Step 502, and transmits the channel information of the MBMS service via the MCCH to the UE of the respective cells within the MBSFN area through a radio interface in the plurality of continuous multicast subframes.

Since the last multicast subframe in the plurality of continuous multicast subframes occupied by the MCCH is a shared subframe, if the MCCH only occupies a part of the shared subframe, other parts can also be used to transmit the information of other channels.

Step 504, the UE receives the MCCH, performs the combination for the MCCH signals.

In that step, the UE located at the MBSFN area receives the MCH signals from a plurality of eNBs, performs the combination for the MCH signals; since the MCH signals from different eNBs are synchronously transmitted, a plurality of MCH signals received by each multicast subframe can be combined.

In the plurality of continuous multicast subframes occupied by the MCCH, the UE receives the channel information of the MCCH from a plurality of eNBs, performs the combination for the MCCH signals.

The embodiment of the invention provides a method for allocating resource to a MCCH, wherein the upper level network element uniformly allocates physical resource to the MCCH, that is, the occupied at least one multicast subframe, and the MCCH resource allocation information is issued to the lower level network element, indicating the lower level network element to transmit the channel information of the MCCH in the at least one multicast subframe through the MCCH, thereby solving the problem of lack of consistency of allocation of physical resource to the MCCH, supporting the UE to perform the combination for the received multi-cell MCH signals, enhancing signal gain, and improving user experience. Moreover, it is possible to adjust the number of the occupied multicast subframes and the occupied modes such as exclusive mode or shared mode according to the size of the channel information borne by the MCCH, thereby enhancing the flexibility of the system.

Figure 6:
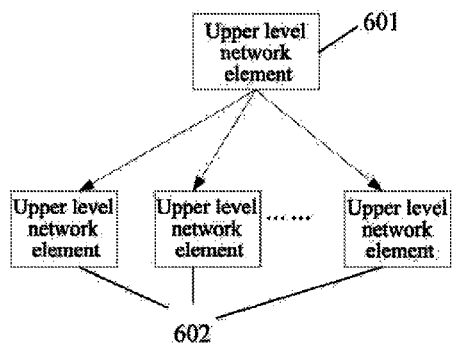
FIG. 6 is a schematic diagram of a system for allocating resource to a MCCH provided in the embodiments of the invention.

The embodiment of the invention further provides a system for allocating resource to a MCCH, as illustrated in FIG. 6, comprising an upper level network element 601 and at least one lower level network element 602;

wherein the upper level network element 601 is used to allocate at least one multicast subframe to the MCCH and transmit the MCCH resource allocation information to the lower level network element 602, indicating the lower level network element 602 to transmit channel information of the MCCH in the at least one multicast subframe;

the lower level network element 602 is used to transmit the channel information of the MCCH to the UE via a radio interface in the at least one multicast subframe according to the MCCH resource allocation information transmitted by the upper level network element 601.

The upper level network element comprises an allocation module and a transmission module, wherein:

the allocation module is configured to allocate at least one multicast subframe to the MCCH;

the transmission module is configured to transmit the MCCH resource allocation information to the lower level network element, indicating the lower level network element to transmit the channel information of the MCCH in the at least one multicast subframe allocated by the allocation module.

The allocation module is further configured to allocate one multicast subframe or more than one continuous multicast subframe to the MCCH according to the information amount of channel information of the MCCH and the number of available multicast subframes.

The allocation module is further configured to: when one multicast subframe is allocated to the MCCH, configure the multicast subframe to be an exclusive subframe or a shared subframe; when more than one continuous multicast subframe is allocated to the MCCH, configure the more than one multicast subframe all to be exclusive subframes; or configure the last multicast subframe in the more than one continuous multicast subframe to be a shared subframe and other multicast subframes to be exclusive subframes; or configure the first multicast subframe in the more than continuous multicast subframes to be a shared subframe and other multicast subframes to be exclusive subframes.

The system for allocating resource to a MCCH in the embodiment of the invention can be combined with the method for allocating resource to a MCCH provided in the embodiments of the invention, wherein the upper level network element uniformly allocates physical resource to the MCCH, that is, the occupied at least one multicast subframe, and the MCCH resource allocation information is issued to the lower level network element, indicating the lower level network element to transmit the channel information of the MCCH through the MCCH in the at least one multicast subframe, thereby solving the problem of lack of consistency of allocation of physical resource to the MCCH, supporting the UE to perform a combination for the received multi-cell MCH signals, enhancing signal gain, and improving user experience.

A person skilled in the art can understand that all or part of the steps for carrying out the method in the above embodiments can be completed by a program instructing the related hardware, wherein the program can be stored in a computer readable storage medium and comprises one of the steps in the method embodiments or combination thereof when implementing.

Furthermore, each function unit in each embodiment of the invention can be achieved by means of hardware and can also be achieved by means of software function module. The integrated module can also be stored in a computer readable storage medium if it is achieved by means of soft function module and is sold or used as an independent product.

The foregoing storage medium can be a read only memory, a disc or optical disk and so on.

The foregoing are only specific embodiments of the invention, but the protection scope of the invention is not limited to that. Any person skilled in the art can readily conceive the alternations or substitutions which shall also be covered within the protection scope of the present invention in the technology range disclosed by the invention. Therefore, the protection scope of the invention shall be subjected to the protection scope of the claims.

INDUSTRIAL APPLICABILITY

The present invention provides a method and a system for allocating resource to a multimedia broadcast multicast control channel, wherein the upper level network element uniformly allocates physical resources to the MCCH, that is, the occupied at least one multicast subframe, and the MCCH resource allocation information is issued to the lower level network element, indicating the lower level network element to transmit channel information of the MCCH through the MCCH in the at least one multicast subframe, thereby solving the problem of lack of consistency of allocation of physical resource to the MCCH, supporting the UE to perform a combination for the received multi-cell MCH signals, enhancing signal gain and improving user experience.

What we claim is:

1. A method for allocating resources to a multimedia broadcast multicast control channel (MCCH), comprising:
    an upper level network element allocating at least one multicast subframe to the MCCH;
    the upper level network element transmitting MCCH resource allocation information to a lower level network element, indicating the lower level network element to transmit channel information of the MCCH in the at least one multicast subframe through the MCCH;
    wherein in the step of the upper level network element allocating the at least one multicast subframe to the MCCH, the upper level network element is able to adjust a number of multicast subframes to be occupied by the MCCH and able to adjust occupied modes of the multicast subframes that are allocated to the MCCH according to an information amount of the channel information of the MCCH and the number of available multicast subframes, wherein, the occupied modes comprise an exclusive mode or a shared mode; wherein
    when the upper level network element allocates one multicast subframe to the MCCH, the upper level network element configures the multicast subframe to be an exclusive subframe or a shared subframe; and
    when the upper level network element allocates more than one continuous multicast subframe to the MCCH, the upper level network element configures a last multicast subframe in the more than one continuous multicast subframe to be a shared subframe and other multicast subframes to be exclusive subframes, or the upper level network element configures a first multicast subframe in the more than one continuous multicast subframe to be a shared subframe and other multicast subframes to be exclusive subframes.

2. The method for allocating resources to said MCCH according to claim 1, wherein when the method is applied to a universal terrestrial radio access network (UTRAN) system, the upper level network element is an upper level radio network controller (RNC) and the lower level network element is a lower level RNC;
    in the step of the upper level network element transmitting the MCCH resource allocation information to the lower level network element, the upper level RNC transmits the MCCH resource allocation information to the lower level RNC via an Iur interface.

3. The method for allocating resources to said MCCH according to claim 1, wherein when the method is applied to an enhanced high speed packet access system (HSPA+), the upper level network element is a general packet radio service (GPRS) service support node (SGSN) or a GPRS gateway support node (GGSN) or a broadcast multicast service center (BMSC), and the lower level network element is a RNC or an enhanced node B.

4. The method for allocating resources to said MCCH according to claim 1, wherein when the method is applied to a long term evolved system (LTE), the upper level network element is a BMSC or an MBMS service gateway (MGW) or a multi-cell/multicast coordination entity (MCE), and the lower level network element is an evolved node B.

5. The method for allocating resources to said MCCH according to claim 1, after the step of the upper level network element transmitting the MCCH resource allocation information to the lower level network element, further comprising:
    the lower level network element transmitting the channel information of the MCCH to a user equipment (UE) via a radio interface in the at least one multicast subframe according to the MCCH resource allocation information.

6. A system for allocating resources to a multimedia broadcast multicast control channel (MCCH), comprising an upper level network element and a lower level network element; wherein
    the upper level network element is configured to allocate at least one multicast subframe to the MCCH and transmit MCCH resource allocation information to the lower level network element, indicating the lower level network element to transmit channel information of the MCCH in the at least one multicast subframe through the MCCH;
    wherein when the upper level network element allocates the at least one multicast subframe to the MCCH, the upper level network element is able to adjust a number of multicast subframes to be occupied by the MCCH and able to adjust occupied modes of the multicast subframes that are allocated to the MCCH according to an information amount of the channel information of the MCCH and the number of available multicast subframes, wherein, the occupied modes comprise an exclusive mode or a shared mode; wherein
    when the upper level network element allocates one multicast subframe to the MCCH, the upper level network element configures the multicast subframe to be an exclusive subframe or a shared subframe; and
    when the upper level network element allocates more than one continuous multicast subframes to the MCCH, the upper level network element configures a last multicast subframe in the more than one continuous multicast subframes to be a shared subframe and other multicast subframes to be exclusive subframes, or the upper level network element configures a first multicast subframe in the more than one continuous multicast subframe to be a shared subframe and other multicast subframes to be exclusive subframes.

7. The system for allocating resources to said MCCH according to claim 6, wherein the lower level network element is configured to transmit the channel information of the MCCH to a user equipment (UE) via a radio interface in the at least one multicast subframe according to the MCCH resource allocation information transmitted by the upper level network element.

8. An upper level network element supporting allocation of resources to a multimedia broadcast multicast control channel (MCCH), comprising:
   a processor; and
   a storage device for storing executable instructions that when executed by the processor cause the processor to performs the steps in the following modules: an allocation module and a transmission module, wherein
   the allocation module is configured to allocate at least one multicast subframe to the MCCH;
   the transmission module is configured to transmit MCCH resource allocation information to a lower level network element, indicating the lower level network element to transmit channel information of the MCCH in the at least one multicast subframe through the MCCH allocated by the allocation module;
   wherein when the allocation module allocates the at least one multicast subframe to the MCCH, the allocation module is able to adjust a number of multicast subframes to be occupied by the MCCH and able to adjust occupied modes of the multicast subframes allocated to the MCCH according to an information amount of the channel information of the MCCH and the number of available multicast subframes, wherein, the occupied modes comprise an exclusive mode or a shared mode; wherein
   when the allocation module allocates one multicast subframe to the MCCH, the allocation module configures the multicast subframe to be an exclusive subframe or a shared subframe; and
   when the allocation module allocates more than one continuous multicast subframes to the MCCH, the allocation module configures a last multicast subframe in the more than one continuous multicast subframe to be a shared subframe and other multicast subframes to be exclusive subframes, or the allocation module configures a first multicast subframe in the more than one continuous multicast subframe to be a shared subframe and other multicast subframes to be exclusive subframes.

9. The upper level network element according to claim 8, wherein
   in a universal terrestrial radio access network (UTRAN) system, the upper level network element is an upper level radio network controller (RNC);
   in an enhanced high speed packet access system (HSPA+), the upper level network element is a general packet radio service (GPRS) service support node (SGSN) or a GPRS gateway support node (GGSN) or a broadcast multicast service center (BMSC);
   in a long term evolved system (LTE), the upper level network element is a BMSC or a MBMS service gateway (MGW) or a multi-cell/multicast coordination entity (MCE).

\* \* \* \* \*